United States Patent [19]

Webster

[11] Patent Number: 4,737,034
[45] Date of Patent: Apr. 12, 1988

[54] RECTANGULAR IMPINGING BEAM

[75] Inventor: Donald R. Webster, Laurel, Md.

[73] Assignee: Pacific Scientific Company, Anaheim, Calif.

[21] Appl. No.: 236,543

[22] Filed: Feb. 20, 1981

[51] Int. Cl.$^4$ .............................................. G01J 3/51
[52] U.S. Cl. .................................. 356/418; 356/419
[58] Field of Search ............... 356/418, 36, 419, 414, 356/416, 352; 350/315, 163; 250/339

[56] References Cited

U.S. PATENT DOCUMENTS

| | | | |
|---|---|---|---|
| 3,885,879 | 5/1975 | Louder et al. | 356/419 |
| 4,040,747 | 8/1977 | Webster | 356/418 |
| 4,082,464 | 4/1978 | Johnson | 356/418 |
| 4,084,909 | 4/1978 | Mathisen | 356/418 |
| 4,154,533 | 5/1979 | Levine | 356/36 |
| 4,400,086 | 8/1983 | Webster | 356/36 |

Primary Examiner—Vincent P. McGraw
Attorney, Agent, or Firm—Lane and Aitken

[57] ABSTRACT

An optical analysis system employs a rectangular beam of light passing through interference filters to analyze the constituents of a test sample moving through the beam. A plurality of interference filters are moved successively through the beam between the source of the beam and the sample and are tilted about an axis as they are moved, thereby transmitting a range of wavelengths to the sample. Skew rays of light in the beam strike the filters at different angles from the angles at which rays parallel to the axis of the beam strike the filters and so transmit wavelengths different from those of rays parallel to the axis of the beam. The angle deviation is greatest for the skew light rays which are skewed from the axis of the beam in a plane perpendicular to the tilt axis of the filters. Thus, the shorter dimension of the rectangular beam is arranged to be perpendicular to the tilt axis of the filters.

10 Claims, 2 Drawing Sheets

RECTANGULAR IMPINGING BEAM

BACKGROUND OF THE INVENTION

In U.S. Pat. No. 4,082,464 to Robert Lincoln Johnson, Jr., issued Apr. 4, 1978, there is disclosed an instrument for measuring and analyzing the optical properties of organic materials to determine the percentages of certain constituents of the test materials. This instrument was developed to satisfy a need for an instrument to rapidly determine the moisture, oil and protein content in grain products. In the instrument disclosed in the patent, a source of wide-band infrared light is positioned to illuminate a sample through a filter assembly in which interference filters are arranged on a wheel on a cylindrical locus. The wheel rotates to move the filters in sequence through a beam of light and to tilt each filter about an axis, thereby varying the angle of incidence of the light to the filters as the filters move through the beam of light, so that the wavelength passed by the filters is swept through a range of values. The intensity of light reflected from or transmitted through a test sample is detected to provide an indication of the reflective or transmissive optical density of the test samples at specific wavelengths. The angular position of each of the filters on the wheel is adjustable to make the range of light wavelengths transmitted by each filter adjustable. By detecting the amount of reflection at selective specific wavelengths and the relationships of these reflectivities, the oil, protein and water content of the sample can be accurately and quickly determined.

U.S. Ser. No. 45,089, filed June 4, 1979, now U.S. Pat. No. 4,400,086 discloses an instrument similar to the type disclosed in the Johnson patent, but in which the filters are in a paddle wheel arrangement and the material to be analyzed is ground automatically in the instrument at the time the measurement is made. In the invention disclosed in the application, a grinder is provided on the instrument with a hopper to hold grain and to introduce it into the grinder. A plate blocks the bottom of the hopper from the grinder so that the hopper may be filled with grain prior to a measuring operation. A reflectivity standard is positioned in the path of the infrared rays prior to each measurement to automatically calibrate the instrument. To initiate operation of the instrument, the reflectivity standard is pivoted out of the path of the infrared light. This action automatically energizes the grinder motor. Then, after a delay of several seconds to permit the grinder motor to get up to speed, grain is permitted to flow from the hopper into the grinder and the ground grain is permitted to flow into a chute, the bottom of which is arranged to receive the infrared light passing through the filter wheel. An impeller, a vibrating trough or other suitable device is mounted at the bottom of the chute to remove the grain from the chute. After another delay of several seconds, sufficient for the chute to fill up, the discharging device is actuated to begin to move the grain out of the bottom of the chute. At this time, the instrument begins to make measurements as the grain in the chute moves through the infrared beam. This provides an automatic averaging from the sample being analyzed.

In the aforementioned instruments, the sample has been illuminated with a light beam which has a large circular cross section, and a problem occurs because of the fact that, although the light is supposed to be columnated, the columnation of the light is not perfect and some light travels diametrically across the circular beam from one side to the other and this angularly directed light, when impinging upon the filters, will pass through the filters at a different angle from the angle of the light which is parallel to the axis of the beam. This results in a wavelength other than the desired wavelength being transmitted through the filter. This effect, called band width spreading, is greatest for the skewed light rays which are skewed from the axis of the beam in a plane perpendicular to the tilting axis of the filter, as compared with those rays which are skewed in a plane parallel to the tilting axis of the filter. This is due to the fact that the light rays which are skewed in the parallel plane will have less of an angular difference from the axial rays as the filter is tilted than will the skewed light in the perpendicular plane. Thus, as the filters are moved through the beam and are tilted relative thereto, the light rays which are skewed in the plane parallel to the tilt axis will introduce a smaller error into the measurement than will the skewed light rays in the plane perpendicular to the tilt axis.

Accordingly, in order to eliminate the light rays which introduce the greatest error into the measurements, the light beam, which has a circular cross section, is passed through a rectangular aperture, so that those skewed light rays which fall farthest from the plane parallel to the tilting axis of the filter are prevented from reaching the sample. Thus, the light beam which does reach the sample has a cross section in the shape of a long narrow rectangle. As a result, the band width spreading due to the skewed light in the plane perpendicular to the tilting axis is greatly reduced. No improvement in the spreading in the plane parallel to the tilting axis is achieved, but, as explained above, this band width spreading occurs to a lesser extent than in the perpendicular plane and causes less of an error.

As the individual filters are swept through the light beam, measurements can only be made when the entire light beam is shining through a particular filter. Since the dimension of the light beam lying in a plane perpendicular to the tilting axis of the filters is greatly reduced by the present invention and since the reduced dimension is parallel to the direction of the movement of the filters, the entire light beam impinges on a given filter for a greater amount of travel of the filter and, therefore, through a greater angle of tilt of the filter as the filter is swept through the beam. Thus, a greater scan of the wavelength with each filter is achieved.

A disadvantage of the rectangular beam is that it illuminates a smaller area of the sample. However, this problem is overcome by using the technique of the ultraspeed detector as disclosed in Ser. No. 45,089, U.S. Pat. No. 4,400,086, in which the grain sample is moved continuously past a window as the sample is measured in order to expose a large area of the sample to the beam. Alternatively, a sample container can be transported past the window in order to get averaging over a sufficient area of the sample to get an accurate measurement.

DESCRIPTION OF THE PREFERRED EMBODIMENT

Figure 1:
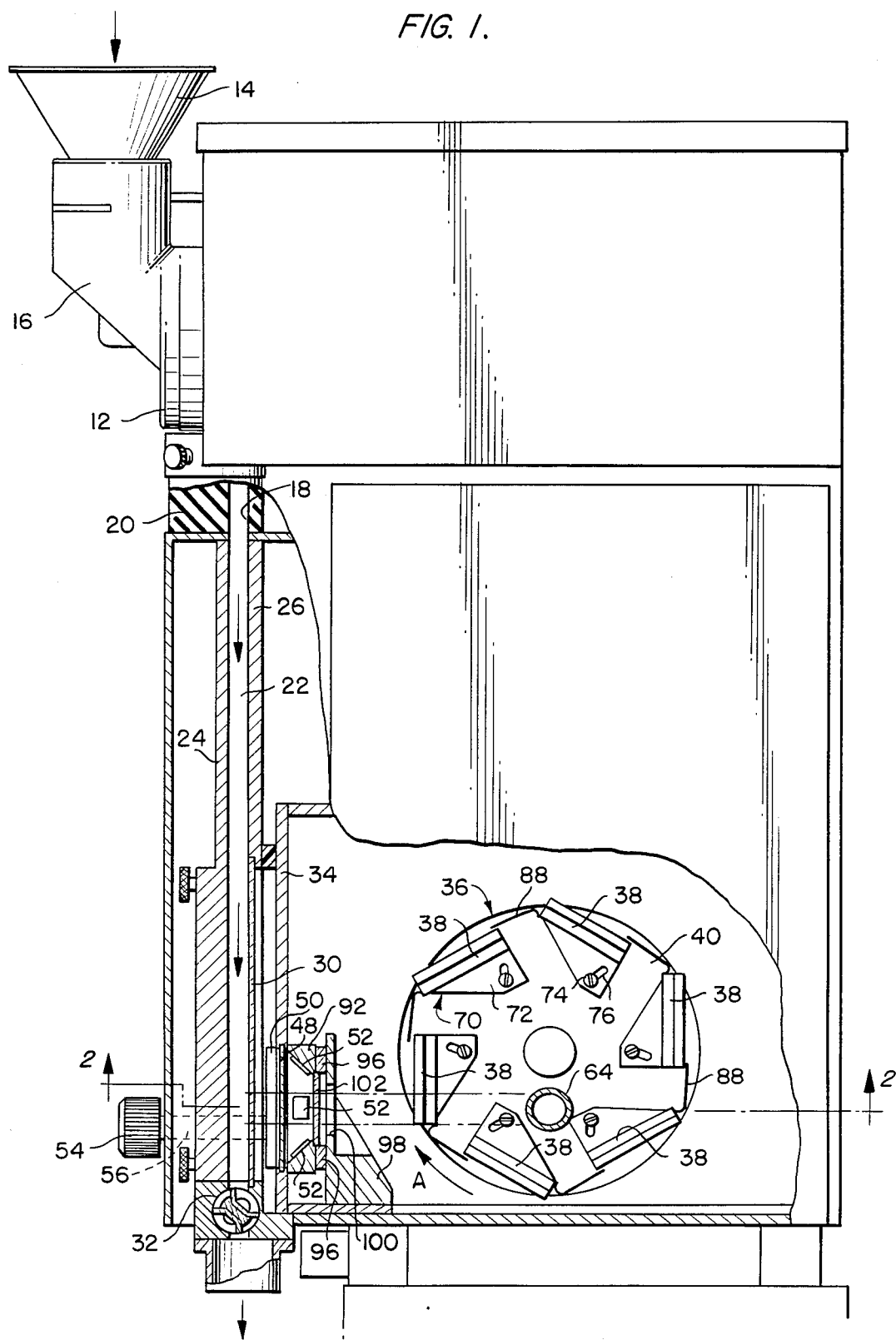
FIG. 1 is a side view in elevation with portions broken away in section showing a measuring instrument employing the rectangular beam according to the present invention.

As shown in FIG. 1, the grain analyzing instrument of the present invention comprises a grinder 12 which is driven by a motor (not shown) and is adapted to receive grain for grinding from a hopper 14. The hopper 14 communicates with an input port to the grinder through a conduit 16, which can be selectively closed by a valve. Grain ground by the grinder 12 exits from the grinder 12 through an exit port at the bottom of the grinder 12 into a passageway 18 formed by a rubberized connector 20. The passageway 18 connects with a vertical chute 22 defined by front and back vertical walls 24 and 26 and side walls 28 (FIG. 2) to have a rectangular cross section. A window 30 formed by an infrared light transmitting pane is formed in the back wall 26 at the bottom of the chute 22. The bottom of the chute is closed by a suitable discharging device such as an impeller 32. Alternatively, the bottom of the chute 22 is closed by a trough mounted on a vibrator. When the trough is still, it acts as a gate, preventing the movement of grain through the chute 22. When the trough vibrates, it maintains the particulate material in a freely flowing condition and removes it from the chute 22. The vibrating trough arrangement is disclosed in a copending application Ser. No. 236,580 filed Feb. 20, 1981 by Donald R. Webster entitled "Optical Analyzing Instrument Having Vibrating Trough", now U.S. Pat. No. 4,422,760, being executed concurrently herewith. The chute 22 together with the passageway 18 is formed to define flush inner side walls, or at least side walls having no ledges facing upward or against the direction of grain travel into the chute 22. This feature is important to avoid clogging of the instrument in operation.

Figure 2:
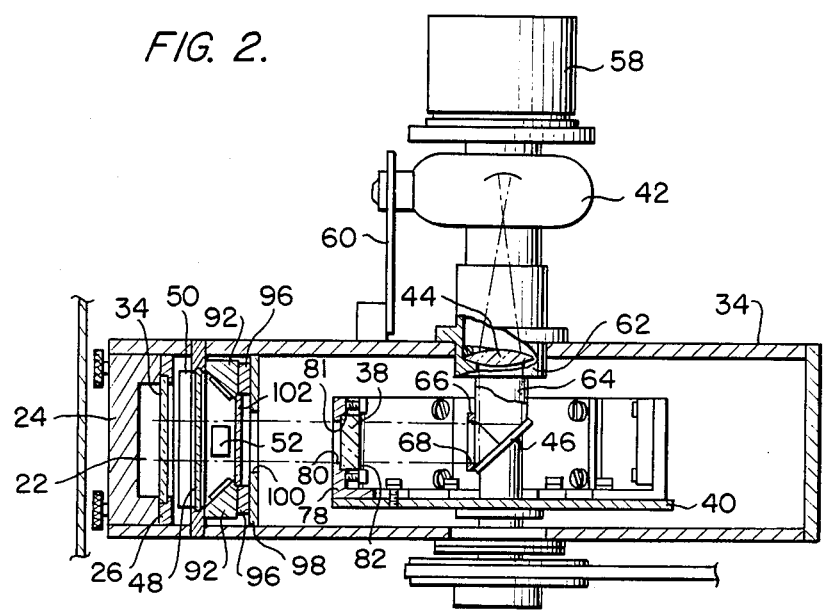
FIG. 2 is a sectional view taken along the line 2—2 in FIG. 1.

Contained within an inner casing 34 behind the window 30 is a filter wheel assembly 36, which is the same as that disclosed in U.S. Pat. No. 4,082,464 to Johnson. As can be seen in FIGS. 1 and 2, six interference filters 38 are mounted on a wheel 40 and are distributed about the axis of the wheel 40, all generally facing the axis of the wheel 40. Wide band visible light from a source 42 is focused into a columnated beam by a lens 44 and reflected by a mirror 46 to pass through the cylindrical locus on which the filters 38 are positioned. The light beam then passes through a window 48 in the front wall of the inner casing 34 and through the window 30 and impinges upon the sample in the chute 22 in the same manner as disclosed in Ser. No. 45,089. Although the embodiment of the invention described herein includes the filters 38 mounted circumferentially on the wheel 40 for movement through the light beam, it is understood that other arrangements, such as a paddlewheel arrangement, can be used to sequentially move the filters through the light beam.

There is a space defined between the window 30 and the inner casing 34 in which a standard arm 50 can pivot. Mounted on the backside of the arm 50 on the side adjacent to the window 48 is a porcelain disc. When the arm 50 is pivoted to a position between the windows 30 and 48, light from the source 42, after passing through the window 48, is reflected from the porcelain disc back through the window 48 to photodetectors 52 positioned to detect light reflected back through the window 48. The porcelain disc serves as a standard of reflectivity to automatically calibrate the instrument in the manner described in U.S. Pat. No. 4,040,747, issued Aug. 9, 1977 to Donald R. Webster, in which a Teflon disc is used as the standard of reflectivity. The porcelain disc serves the same purpose as the Teflon disc in the Webster patent.

The arm 50 can be pivoted away from its position between the windows 30 and 48 by rotating a knob 54 connected to the arm 50 by a shaft 56, so that light from the source 42, after being filtered by the filter wheel assembly 36 can pass through both windows 48 and 30 into the chute 22 to impinge upon grain in the bottom of the chute. The filtered infrared light is then reflected back through the windows 30 and 48 to the photodetectors 52 which apply an electrical signal corresponding to the intensity of the reflected light to an analysis system. The analysis system is described in the aforementioned U.S. Pat. No. 4,040,747.

During operation, the wheel 40 rotates continuously to bring the filters 38 sequentially into the light beam extending between the mirror 46 and the sample in the path of the light beam. Each of the interference filters 38 is designed to pass a different selected wavelength when the light passing through the filter 38 is normal to the plane of the filter. The wavelength transmitted by each filter 38, however, will vary depending upon the angle of incidence of the light to the plane of the filter. As each filter 38 moves through the beam of light extending between the mirror 46 and the sample, the filter 38 tilts about an axis and the angle of the filter 38 to the incident light varies continuously and, as a result, the wavelength transmitted by the filter 38 changes and is swept through a range of values. Also as the wheel 40 rotates, a decoder 58 produces pulses at a rate of one thousand pulses per revolution and a reset pulse once per revolution. In response to these pulses, the system analyzes outputs from the photodetectors 52 at specific angular positions of the wheel 40 and, thus, at specific selected wavelengths incident upon the sample in the path of the light beam. As stated in the abovementioned Webster patent, the outputs are sampled at a plurality of predetermined times during the sweep of each filter 38 through the light beam. Since each predetermined time corresponds to a different angle of the filter 38 relative to the light beam, and, therefore, to a different transmitted wavelength, the outputs of the photodetectors 52 can be and are sampled at a plurality of different wavelengths incident upon the test sample during a single sweep of the filter 38. In response to these detected reflected intensities, the system analyzes the test sample. For example, it determines the oil, protein and water content of a grain sample. The details of an exemplary analysis system are disclosed in the above-mentioned Webster patent.

The light source 42 is a lamp mounted on a bracket 60, which in turn is supported on the inner casing 34. The lens 44 is mounted in a lens housing 62, which in turn is mounted in an opening in the inner casing 34 between the light source 42 and the mirror 46. The lens housing 44 is cylindrical and the end thereof facing the light source 42 is provided with an aperture to limit the amount of light from the source 42 impinging upon the lens. The mirror 46 is fixed at an angle to the end of a tube 64 mounted on the inner casing 34 coaxial with the lens housing 62, so that the light is reflected in the direction of the windows 48 and 30. A plate 66 having a rectangular slot 68 is mounted on the end of the tube 64 perpendicularly across the light to form a rectangular beam of light.

As best shown in FIGS. 1 and 2, each interference filter 38 is mounted on the wheel 40 by means of a mounting assembly 70 comprising a support and a bracket. The support has a triangularly-shaped leg 72 mounted on the wheel 40 by means of a pin (not shown), about which the support may pivot, and a screw 74 passing through an angular slot 76 in the leg 72 and tapped into the wheel 40. The support has extending perpendicularly to the leg 72 a pedestal 78 which is provided with a rectangular aperture 80 in the middle and a U-shaped recess 81 extending throughout the length of the pedestal 78 in which the interference filter 38 is positioned. The bracket is a thin plate 82 provided also with a rectangular aperture 84 in the middle thereof and fits over the top of the filter 38. Four screws 86 pass through the bracket and are screwed into the four corners of the pedestal 78 to hold the filter 38 securely in place on the mounting assembly 70. The bracket folds over both ends of the filter 38 to hold the filter 38 secure against movement in a direction tangential to the arc of filter movement. The U-shaped recess 81, in which the filter 38 fits, secures the filter 38 against movement in a direction perpendicular, to the plane of the wheel 40. At one end of the bracket, the folded-over portion is provided with an extension in the form of a planar opaque plate 88 bent at an angle from the folded-over portion so as to be generally perpendicular to the radius of the wheel. The extension extends over to just below the adjacent filter mounting assembly 72 on the wheel 40. The function of the opaque plate 88 is to block the light between the mirror 46 and the chute 22 in the angular intervals between the filters 38 so as to provide a dark period during which the electronic circuit in the system is reset in accordance with the photodetector output as described in the above-mentioned Webster patent.

The angular position of each filter 38 on the wheel 40 can be adjusted through 10° by means of the screw 74, the slot 76 and the pivotal mounting on the pin. Simply by loosening the screw 74, the mounting assembly 70 can be pivoted about the pin to the desired angular position and the screw 74 retightened to hold the mounting assembly 70, and thereby the filter 38, in a new selected angular position.

The photodetectors 52 are mounted on the side walls of a truncated conical chamber 90. There are four photodetectors 52 and they are equally angularly distributed about the axis of the conical chamber 90, which is aligned with the rectangular columnated light beam from the mirror 46. The conical chamber 90 is defined by a block 92 mounted on a plate 94 which is mounted in slots in the opposite sidewalls of the inner housing 34. The conical chamber 90 extends through the block 92 to provide circular openings at the front and back thereof. The plate 94 is similarly provided with a circular opening slightly smaller than the opening at the back of the block 92 and coaxial with the beam of light reflected by the mirror 46. Mounted on the back of the block are four thermoelectro cooling elements 96, one directly behind each of the photodetectors 52, functioning to maintain the photodetectors 52 at a selected temperature. Mounted on the back of the cooling elements 96 is a thermally conducting member 98 serving to provide a heat sink for the system to help maintain the photodetectors 52 at an even temperature. The thermally conducting member 98 is also provided with an aperture 100 coaxial with the beam of light reflected from the mirror 46 and selected to be only slightly larger than the beam to reduce the amount of stray light entering into the chamber 91. The opening in the back of the block 92 is closed by a transparent pane 102 fitting in a recess surrounding the aperture in the back of the block 92. The transparent pane 102 and the window 48 serve to prevent foreign matter from getting into the chamber 91.

To initiate a measurement operation, which is more fully described in the aforementioned Webster patent, the operator rotates the knob 54 to move the standard arm 50 to its upper position. This will initiate energization of an electromagnet to hold the arm 50 in its upper position and, at the same time, initiate energization of the grinder motor. After a delay of two seconds, selected to permit the grinder motor to get up to speed, a rotary solenoid is energized to open the grain gate and allow the grain to be fed to the grinder 12. The grinder 12 will then begin to grind the grain and direct the ground grain into the chute 22. Then, after a delay of several seconds, selected to be sufficient to let the bottom of the chute 22 fill up sufficiently with ground grain at least past the top of the window 30, a motor will be energized to begin to drive the discharge assistant, in this case the impeller 32. As a result, the impeller 32 will remove the ground grain from the bottom of the chute 22 and cause the ground grain in the chute 22 to move past the window 30 in a continuous bed. As the grain is being moved past the window 30, infrared light from the source 42 passes through the filters 38 of the filter wheel 40 and impinges upon the grain, from which it is reflected to the photodetectors 52, and measurements of the constituents of the ground grain are made in a manner described in the above-mentioned Webster patent. After about 8 seconds, the measurement is completed and the standard hold-up magnet and the solenoid are de-energized. Accordingly, the standard arm 50 falls back down between the windows 30 and 48 and the grain gate returns to its closed position. Then, after another delay of 16 seconds, selected to insure that the grinder 12 and the chute 22 are exhausted of the grain samples, the grinder 12 and the grain removal motor are deenergized to return the system to a condition ready to make the next grain measurement.

Figure 3:
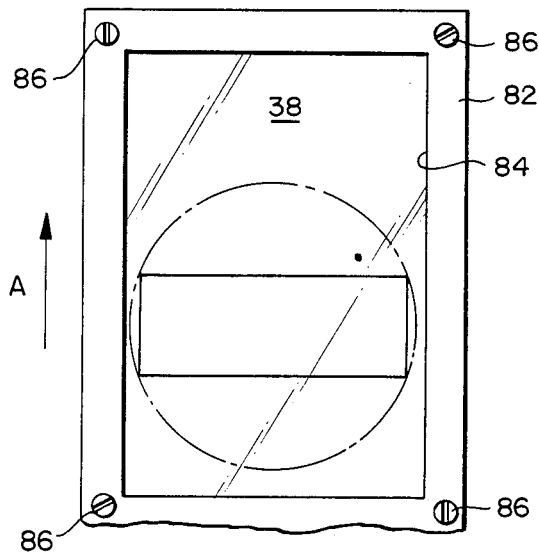
FIG. 3 is an enlarged view of one of the filters of the measuring instrument, showing a rectangular beam impinging thereupon, with a circular beam shown in broken lines.

FIG. 3 illustrates the reduced cross-sectional area of the rectangular impinging beam in contrast with the area of a corresponding circular beam. The filters 38 move through the beam in the direction of the arrow A, tilting about an axis through the plane of the filter perpendicular to the direction of movement. The dimension of the rectangular light beam parallel to the tilt axis is nearly the same as the diameter of the circular beam. However, the dimension of the rectangular light beam perpendicular to the tilt axis is appreciably smaller than the diameter of the circular light beam. As a result, the errors introduced by skew light rays impinging upon the filter 38 in regions remote from the tilt axis are greatly reduced. In addition, it can be seen that the height of the rectangular beam in FIG. 3 is smaller in relation to the height of the filter 38 than is the height of the circular beam, so that the entire rectangular beam will pass through the filter 38 for a greater length of travel of the filter 38 than will the entire circular beam. Thus, measurements can be made with the rectangular beam during a greater distance of travel of the filter 38 than can be made with the circular beam. Therefore, measurements can be made for a particular filter 38 through a greater range of tilt angles with respect to the light beam for the rectangular beam than for the circular beam. After passing through each of the filters 38, the light beam impinges upon the grain, which moves through the chute 22 in the direction opposite to the direction of the arrow A. Since the grain in the chute 22 is moving during the measurements, the rectangular light beam impinges upon a large area of grain so that the measurements can be averaged for a large area of the sample, thereby increasing the accuracy of the measurements. Thus, the analyzer does not suffer from the fact that the rectangular impinging beam is smaller in area than the circular beam.

Figure 4:
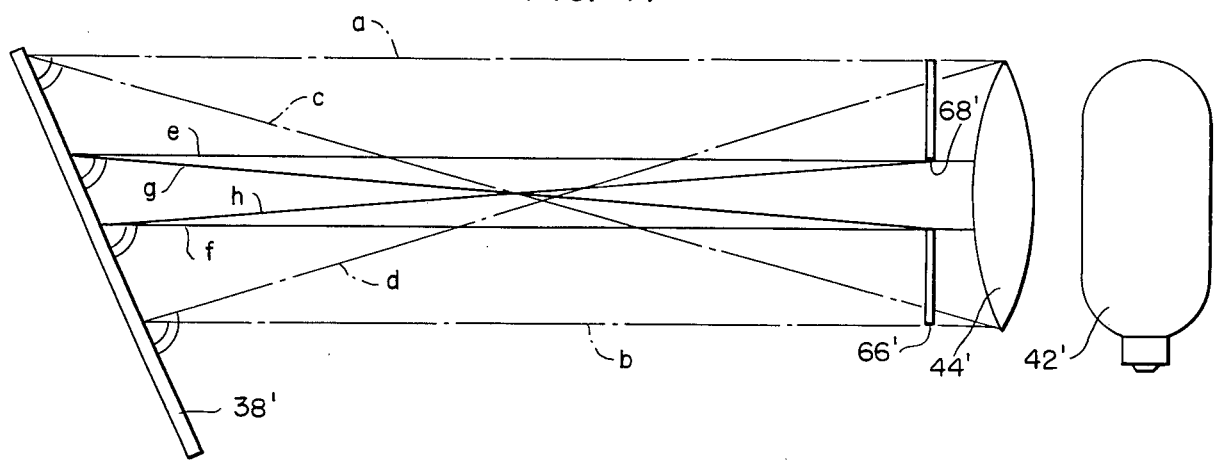
FIG. 4 is a schematic illustration of light rays within a rectangular beam impinging upon the filter, with light rays within a circular beam shown in broken lines.

Skew light rays which pass through the filter 38 strike the filter 38 at a different angle from the majority of the rays which are parallel to the axis of the beam. Moreover, for skew rays which are skewed in a plane perpendicular to the tilt axis, the difference between the angle formed between the parallel rays and the filter and between the skew rays and the filter does not change as the filter tilts. FIG. 4 illustrates schematically how some light rays emanating from a source 42' and passing through a columnating lens 44' go askew of the axis of the light beam and impinge upon an interference filter 38' at angles that differ from the angle made by the rays that are parallel to the axis of the beam. The broken lines a and b represent the light rays of a circular beam which are farthest from the tilt axis of the filter 38' and parallel to the axis of the beam. Rays a and b strike the filter 38' at the same angle and, thus, add to the uniformity of the wavelengths of the rays passing through the filter 38' and impinging on the sample. The broken lines c and d represent the light rays of the circular beam which skew across the entire beam before striking the filter 38'. They impinge on the filter 38' at angles greatly different from the angle made by the parallel light rays a and b. When the plate 66' containing the rectangular slot 68' is placed in the path of the circular light beam, the rays a and b, as well as the rays c and d, the rays which differ the most from the parallel rays, are blocked, and only a rectangular beam passes through the slot to reach the filter 38'. The rays that differ the most from the parallel rays e and f of the rectangular beam in the direction perpendicular to the tilt axis and parallel to the movement of the filter 38' are the rays g and h, which skew across the entire height of the rectangular beam. As can be seen from FIG. 4, the variation between the angles at which the rays g and h strike the filter 38' and the angle at which the parallel rays e and f strike the filter 38' is much less than the variation between the angles formed by the parallel rays and by the skew rays c and d of the circular beam.

In contrast to the skew light rays which are skewed in a plane perpendicular to the tilt axis, for skew rays which are skewed along a plane parallel to the tilt axis, the difference in the angle between the parallel axial rays of the light beam and the filter and the angles formed between the skew rays and the filter is the greatest when the parallel axial rays are perpendicular to the filter. As the angle between the parallel axial rays and the filter decreases, the difference between the angle formed between the parallel axial rays and the filter and the angles formed between the skew rays and the filter decreases. Thus, the deviation of the angles made by the skew rays from the angle made by the parallel axial rays is less in a plane parallel to the tilt axis than it is in a plane perpendicular to the tilt axis. Therefore, the measurement errors introduced by skew lines in a plane parallel to the tilt axis are smaller. Consequently, the greatest errors are eliminated by decreasing the dimension of the impinging light beam which is perpendicular to the tilt axis.

The above description is of a preferred embodiment of the invention and many modifications may be made thereto without departing from the spirit and scope of the invention as defined in the appended claims.

What is claimed is:

1. In an optical analysis system having a plurality of interference filters, means for providing a beam of light, means for moving a test sample through said beam of light, means for moving said interference filters in sequence through said beam of light between said beam providing means and said test sample and for tilting each filter about an axis through a range of angles with respect to the beam, each said filter adapted to transmit a range of wavelengths of said light as it is tilted with respect to said light beam, photodetecting means to detect light from said beam after said light has come into optical contact with said test sample and to provide a signal indicative of said detected light, means responsive to said signal only at a plurality of predetermined times as each said filter is moved through said light beam to determine a characteristic of said sample, each said predetermined time corresponding to a different wavelength within the variable wavelength range transmitted by each said filter during its movement through said light beam, the improvement comprising:

means defining an elongated aperture in the path of said light beam, said aperture comprising means to shape the light beam transmitted to said filters by blocking the rays of said light beam transmitted to the aperture outside the perimeter of said aperture, so that the light beam has a cross section with a first dimension parallel to the tilt axis of each said filter and a second dimension perpendicular to the tilt axis, said first dimension being larger than said second dimension, whereby skew light rays which strike the filters at angles which deviate most from the angle at which parallel axial light rays of the light beam strike the filters are eliminated.

2. The optical analysis system of claim 1 wherein said aperture is rectangular.

3. The optical analysis system of claim 1 wherein the light beam providing means includes a light source, means for collimating light from the source to define said beam, whereby a collimated light beam passes through said aperture to said filters.

4. The optical analysis system of claim 1 wherein the smaller, second dimension of the cross section of the light beam is parallel to the direction of the movement of the filters, so that the entire cross section of the light beam impinges on each filter for a greater distance of travel of the filter.

5. The optical analysis system of claim 1 wherein the larger, first dimension of the cross section of the light beam is perpendicular to the movement of said test sample, whereby the area of the test sample upon which the light beam impinges is maximized.

6. In an optical analysis system having a plurality of interference filters, means for generating a beam of light, means for moving said interference filters in sequence through said beam of light and for tilting each filter about an axis through a range of angles with respect to the beam of light, each said filter adapted to transmit a range of wavelengths of said light as it is tilted with respect to said light beam, the improvement comprising means defining an elongated aperture in the path of said light beam, said aperture comprising means to shape the beam of light transmitted to said filters into an elongated cross section by blocking the light rays of said beam outside the perimeter of said aperture, with the longer dimension of said cross section parallel to the tilt axis of each said filter, whereby skewed light rays which strike the filters at angles which deviate most from the angle at which parallel axial rays of the beam strike the filters are eliminated.

7. The optical analysis system of claim 6 wherein said aperture is rectangular.

8. The optical analysis system of claim 6 wherein the light beam providing means includes a light source, and means for collimating light from the source to define the beam.

9. The optical analysis system of claim 6 wherein the smaller, second dimension of the cross section of the light beam is parallel to the direction of the movement of the filters, so that the entire cross section of the light beam inmpinges on each filter for a greater distance of travel of the filter.

10. An optical analysis system as recited in claim 6, wherein said means for moving said interference filters comprises means for mounting said filters in a cylindrical locus for rotation about an axis, a mirror mounted within said cylindrical locus positioned in the path of said beam of light to reflect said beam of light through said cylindrical locus, said elongated aperture being located adjacent to said mirror between said mirror and said cylindrical locus.

* * * * *

UNITED STATES PATENT AND TRADEMARK OFFICE
CERTIFICATE OF CORRECTION

PATENT NO. : 4,737,034

DATED : April 12, 1988

INVENTOR(S) : Donald R. Webster

It is certified that error appears in the above-identified patent and that said Letters Patent is hereby corrected as shown below:

Column 10, line 7, "inmpinges" should read --impinges--.

Column 10, line 11, delete "for".

Signed and Sealed this

Eighteenth Day of April, 1989

Attest:

DONALD J. QUIGG

*Attesting Officer*

Commissioner of Patents and Trademarks